(12) United States Patent
Davidsson

(10) Patent No.: US 6,254,474 B1
(45) Date of Patent: Jul. 3, 2001

(54) OPERATING DEVICE FOR A VENTILATION SYSTEM IN A VEHICLE

(75) Inventor: Staffan Davidsson, Göteborg (SE)

(73) Assignee: Scania CV Aktiebolag (publ) (SE)

(*) Notice: Subject to any disclaimer, the term of this patent is extended or adjusted under 35 U.S.C. 154(b) by 0 days.

(21) Appl. No.: 09/367,929

(22) PCT Filed: Dec. 21, 1998

(86) PCT No.: PCT/SE98/02401

§ 371 Date: Nov. 5, 1999

§ 102(e) Date: Nov. 5, 1999

(87) PCT Pub. No.: WO99/34993

PCT Pub. Date: Jul. 15, 1999

(30) Foreign Application Priority Data

Dec. 22, 1997 (SE) .................................................. 9704803

(51) Int. Cl.[7] .................................................. B24D 13/00
(52) U.S. Cl. .................................... 454/69; 237/12.3 A
(58) Field of Search ........................... 454/69, 121, 143; 237/12.3 A

(56) References Cited

U.S. PATENT DOCUMENTS 4,936,159 * 6/1990 Kallio ............................. 74/501.5 R
5,338,249 * 8/1994 Hildebrand et al. ................. 454/126
5,700,191 * 12/1997 Nieling et al. ......................... 454/69
6,042,472 * 3/2000 Arsenault et al. ..................... 454/69

FOREIGN PATENT DOCUMENTS 2212587   7/1989  (GB).

* cited by examiner

*Primary Examiner*—Denise L. Ferensic
*Assistant Examiner*—Derek S. Boles
(74) *Attorney, Agent, or Firm*—Ostrolenk, Faber, Gerb & Soffen, LLP

(57) ABSTRACT

The invention relates to a control unit for a ventilation arrangement in a vehicle. The control unit is designed to indicate and initiate supply of an air flow to at least three intake air regions in the vehicle, which regions may include a defroster region, a panel region and a floor region. The control unit incorporates a first control device (1) designed to indicate and initiate a supply of air flow to the three intake air regions by a first intake air distribution which in each control position caters for at most two of the intake air regions. The control unit also incorporates a second control device (2) designed to indicate and initiate supply of the air flow to the three intake air regions by a second intake air distribution which in each control position caters for at most two of the intake air regions. The result is that the intake air can be distributed variably between the three intake air regions.

13 Claims, 2 Drawing Sheets

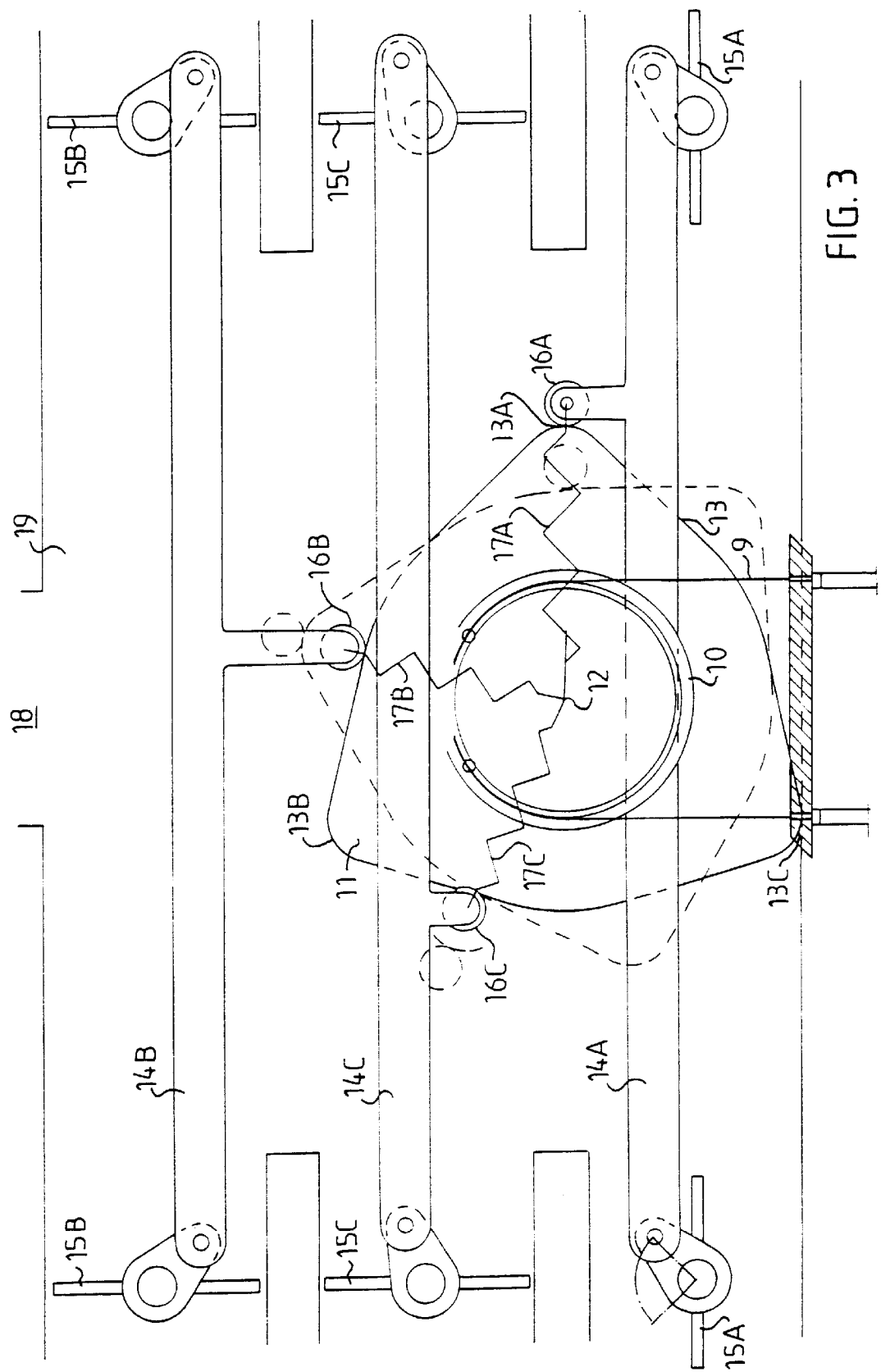

OPERATING DEVICE FOR A VENTILATION SYSTEM IN A VEHICLE

BACKGROUND OF THE INVENTION, AND STATE OF THE ART

The invention relates to a control unit for a ventilation arrangement in a vehicle whereby the control unit is designed to indicate and initiate a supply of an air flow to at least three intake air regions in the vehicle, which control unit incorporates a first control device designed to indicate and initiate a supply of said air flow to the three intake air regions by a first intake air distribution which in each control position caters to at most two of said intake.

A control unit in a vehicle needs to be designed so that it can be easily and intuitively read and set to achieve a desired effect. It is also necessary for its setting to be possible without the vehicle driver having to shift his gaze and hence his concentration from surrounding traffic. Control units for controlling intake air in a vehicle usually supply the intake air to three regions, viz. a defroster region, a panel region and a floor region. A problem which arises in this respect is designing a control unit which in a simple and natural manner does at the same time indicate and symbolize a desired intake air supply to these three regions.

Known from, for example, GB, B, 2 212 587 is a control unit for a ventilation arrangement in a vehicle which incorporates a control device in the form of a knob which can be set at and between indicating positions associated with three intake air regions. This entails the limitation that a single control device can only be set between two indicating positions, with the result that intake air can only be supplied to at most two intake air regions simultaneously. Simultaneous supply of intake air to all three intake air regions is thus impossible. Moreover, intake air cannot be supplied simultaneously to two regions which do not have adjacent indicating positions.

Another known control unit for supply of intake air to said three intake air regions in a vehicle uses three separate control devices, one for each intake air region.

Each of these three control devices is moved individually along its separate path. This control unit makes it possible for intake air to be supplied entirely variably to said intake air regions. Disadvantages of this control unit are that it occupies a large amount of space on the instrument panel and that the driver has to shift his gaze from surrounding traffic in order to make sure that the correct control device is set and what position it is in.

SUMMARY OF THE INVENTION

The object of the present invention is to eliminate the aforesaid disadvantages of existing control units for a ventilation arrangement in a vehicle that the control unit incorporates a second control device designed to indicate and initiate a supply of an air flow to the three intake air regions by a second intake air distribution which in each control position caters to at most two of said intake air regions; i.e. to provide a control unit which in an easy and natural manner indicates and initiates intake air supply to at least three intake air regions. It is also desired to provide an intake air system which can encompass all three intake air regions simultaneously.

This object is achieved by the control unit also incorporating a second control device designed to indicate and initiate the supply of said air flow to the three inlet regions by a second intake air distribution system which in each control position caters to at most two of said intake air regions. Using two control devices means that they can be set so that intake air can be provided to all three intake regions simultaneously or, if so desired, to any two out of said three intake air regions or to only one intake air region. The two control devices being set in two separate positions results in it being appreciated intuitively that the total intake air distributed is the aggregate indicated setting of said two control devices. If for example one of the control devices is set in a defroster position while the other control device is set in a floor position, it is appreciated intuitively that the intake air is distributed equally between these two intake air regions.

According to one embodiment of the invention the first and second control devices are movable along a path which exhibits along its extent indicating positions associated with said intake air regions. Said indicating positions along the path should substantially symbolize the location of the inlet air regions in the vehicle. In other words, the locations of the intake air regions in the vehicle should in a natural way reflect the indicating positions along the path, e.g. if the inlet air regions are located in a vertical direction or in a lateral direction of the vehicle, said path may extend in that direction, and the indicating position of each air intake region may be situated along that path according to its actual location in the vehicle.

According to a further and advantageous embodiment of the invention, the first and second control devices are movable along a common path. This means that the control unit can be made relatively compact so as not to occupy an unnecessarily large area of the instrument panel. Said first and second control devices may also be arranged one after another along this path. This enables the control devices to be moved along said path together if, for example, they are to be set in the same indicating position such as a defroster position when it is desired that all of the intake air should flow up towards the windscreen.

According to another advantageous embodiment of the invention, said path takes the form of a substantially arcuate section. When moving a control device along an arcuate path, the driver can, via the controlling hand, detect the curvature of the path or the angle of inclination of the control device, and hence perceive the approximate setting of the control device without removing his gaze from surrounding traffic. It is in this case advantageous if said arcuate section extends substantially in a vertical direction of the vehicle so that said intake air region indicating positions (defroster, panel and floor) can be arranged in a vertical direction along said arcuate section.

To facilitate manual operation of the control unit, the first and second control devices each include a manual gripping part. It is advantageous if said gripping part includes an elongate section extending substantially perpendicular to the extent of the path. It is appropriate if said gripping part also extends out towards the driver so as to be easy to grip. It is advantageous if said long and narrow section is designed so that, depending on its position along the path, it points in a direction perceivable by hand. If the path is non-linear in form, an elongate gripping part which extends at an angle relative to the extent of the path will, depending on the curvature of the path, point in a specific direction. In the case, for example, of a path which is arcuate and extends in a vertical direction in the vehicle, the direction in which said section points can be perceived by its being gripped by hand. If said section points substantially upwards, the control device will be in a defroster position, but if said section points substantially horizontally the control device will be in a panel position, and if said section points downwards the control device will be in a floor position. Intermediate positions for each control device can also be perceived between these three intake air region indicating positions.

BRIEF DESCRIPTION OF THE DRAWINGS

An example of a preferred embodiment of the invention is described below with reference to the attached drawings, in which:

FIG. 3 shows a control arrangement and damper for supplying intake air to three intake air regions in a vehicle.

DETAILED DESCRIPTION OF A PREFERRED EMBODIMENT OF THE INVENTION

Figure 1:
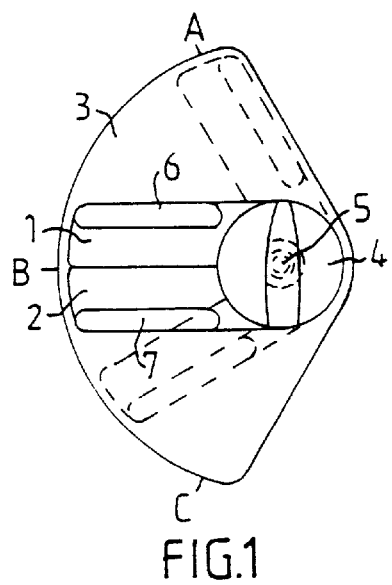
FIG. 1 shows a control unit according to the invention.
Figure 2:
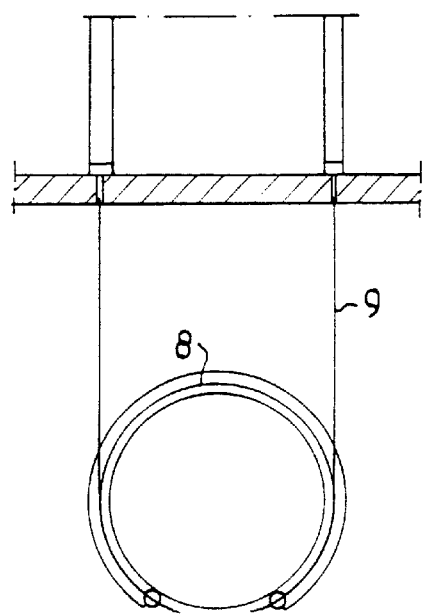
FIG. 2 shows a cable device for transmitting the rotary motion of a control device.
Figure 1A:
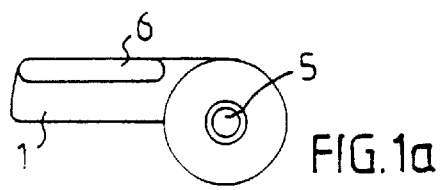
FIG. 1a shows the first control device in FIG. 1.
Figure 1B:
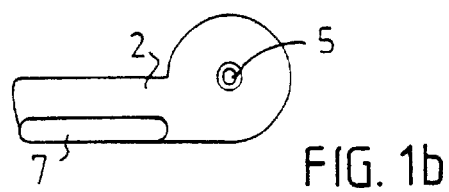
FIG. 1b shows the second control device in FIG. 1.

FIG. 1 depicts a control unit for a ventilation arrangement in a vehicle. The control unit incorporates a first control device 1 and a second control device 2 which are designed to indicate and initiate the supply of an air flow to three intake air regions in the vehicle, viz. a defroster region, a panel region and a floor region. The first control device 1 and the second control device 2 are movable along the path 3 which takes the form of a substantially arcuate section.

Three indicating positions A, B, C also called main control positions are marked along the extent of said path 3, each for its respective intake air region. These indicating positions A, B, C along the path 3 represent the locations of the intake air regions in a vertical direction of the vehicle so that indicating position A corresponds to intake air to the defroster region, indicating position 3 corresponds to intake air to the panel region and indicating position C corresponds to intake air to the floor region. This enables the driver to understand naturally and intuitively how to operate the control devices 1, 2 in order to achieve a desired distribution of intake air to the respective regions.

Moving the two control devices 1, 2 to the upper indicating position A will cause all the air to be directed to the defroster region of the vehicle. Correspondingly, placing the two control devices 1, 2 in indicating position B will cause all the intake air to be supplied to the panel region, and placing the two control devices 1, 2 in indicating position C will cause all the intake air to be supplied to the floor region. An advantage of having two control devices 1, 2 as compared with having only one is that they make it possible to distribute intake air to two non-adjacent indicating regions, thus intake air can be supplied to the defroster region and the floor region, which is not possible with only one control device. Such a distribution is achieved by moving the first control device 1 to indicating position A and the second control device 2 to indicating position C.

The two control devices 1, 2 can also be used to distribute the intake air to the three intake regions in such a way that the three intake air regions simultaneously receive a certain quantity of intake air. This is achieved by placing the first control device with a first distribution of the intake air between indicating positions A and 3, while at the same time placing the second control device 2 with a second distribution of the intake air between indicating positions 3 and C. The distribution of the quantities of intake air between the three intake air regions is determined by the spacing at which the control devices 1, 2 are placed relative to the respective indicating positions A–C. If in this case the first control device 1 is placed midway between indicating positions A and B, and the second control device 2 is placed midway between indicating positions 3 and C, the air flow will be distributed entirely equally between the three intake air regions.

To vary the total intake air quantity, the control unit includes a knob 4 for adjusting an intake air fan. The knob 4 is arranged to rotate about a spindle 5 about which the control devices 1, 2 are also rotatable. The control unit thus assumes a compact form which makes it easy for the hand to move from the control devices 1, 2 to the knob 4. Adjacent to the control unit there may also be a control device for adjusting the temperature of the intake air supplied.

Each of the first and second control devices 1, 2 exhibits a manual gripping part which incorporates a long and narrow section 6, 7 which extends substantially perpendicular relative to the extent of the arcuate path 3. This means that the long and narrow sections 6, 7 will, depending on their position along the path, point in a significant direction outwards from the spindle 5. This enables a driver to use his hand to detect the direction of pointing and hence perceive how the intake air is distributed between the three intake air regions, without having to shift his gaze from surrounding traffic when operating the control unit on the instrument panel.

For the initiating of intake air supply to said three intake air regions in the vehicle, each of the control devices 1, 2 is firmly arranged on its respective rotatable pulley 8 on which a cable 9 is arranged for transmitting the rotary motion of the respective control device 1, 2 to a control arrangement which is designed to supply intake air to the respective intake air regions according to the respective setting of the control devices 1, 2. FIG. 3 depicts this control arrangement but only shows one cable 9 for transmitting the setting of one control device 1, 2 to the control arrangement, although each control device 1, 2 incorporates a cable 9 for initiating operation of the control arrangement. Each cable 9 runs over a pulley 10 in the control arrangement for rotation of the pulley 10 together with a cam device 11 coupled to the pulley. Each of the control devices 1, 2 is thus designed to operate, independently of the other, its cam device 11. The cam devices 11 consist of two parallel identical cam discs which are thus each rotatable by its cable 9 about a common spindle 12. Each cam device 11 incorporates external cam surfaces 13 with a varying cam height from the spindle 12. The cam devices 11 are each designed to act upon arms 14 A–C (each arranged for its intake air region) in order to vary the setting of dampers 15 A–C between open and closed positions. Each arm 14 A–C incorporates a roller device 16 A–C designed to bear upon and be acted upon by whichever of the two cam surfaces 13 of the two cam devices 11 displays the greater cam height in the region of the roller device 16 A–C. Each arm 14 A–C being flexibly arranged in the cam height direction and the roller devices 16 A–C incorporating a steel roller and being designed to extend across the two cam devices 11 results in each roller device 16 A–C being in contact with whichever cam surface 13 of the cam devices 1, 2 exhibits the greater cam height n the region of the roller device 16 A–C. The arms 14 A–C incorporate first and second end portions between which the roller devices 16 A–C are arranged. Both end portions of the arms 14 A–C are connected to the dampers 15 A–C in order to vary the latter's setting. The number of dampers 15 A–C is in this case two per intake air region but may be varied depending, for example, on how many points intake air is supplied to in the respective region. The arms 14 A–C are each resiliently urged towards the cam surfaces 13 of the cam devices 11 by their respective spring device 17 A–C arranged between each of said arms 14 A–C (in the vicinity of the respective roller device 16 A–C) and the cam device's spindle 12. Air is supplied via a duct 18 to a damper housing 19 in which the control arrangement described above is arranged.

Each control device 1 and 2 (see FIG. 1) is rotatable for about 120° along the arcuate path 3. This rotary motion is transmitted by the cable 9 to the respective cam device 11, which is also rotatable approximately 120°. The cam surface 13 of each cam device 11 exhibits three tips 13 A–C distributed at mutual spacing of about 120° along the cam surface 13. When a roller device 16 A–C is situated on one of these tips 13 A–C, the respective arm 14 A–C is designed to open the respective damper 15 A–C to the maximum extent. This takes place when the control devices 1, 2 are arranged in one of the indicating positions A, B or C.

When the control arrangement is set as depicted in FIG. 3, roller device 16 A is situated on tip 13 A of the cam surface so that damper 15 A is fully open, while roller devices 16 B, C are situated along the cam surface 13 where the cam height is at a minimum, so that dampers 15 B, C are fully closed. If thereafter the control devices 1, 2 are together moved from the depicted indicating position A to indicating position B, roller 16 A will follow the cam surface 13 of the cam device 11, the cam height of which will thus progressively decrease, i.e. the distance of the cam surface 13 from the cam device's spindle 12 will decrease, while at the same time arm 14 A progressively closes damper 15 A.

During this process, roller device 16 B will move along the cam surface 13 of the cam device 11, the cam height of which will thus progressively increase until the control devices 1, 2 have reached indicating position B, at which roller device 16 B is situated on cam surface tip 13 B and damper 15 B is fully open. This position is indicated by chain-dotted lines in FIG. 3. During the movement of control devices 1, 2 between indicating positions A and B, roller device 16 C will move along a region of the cam surface 13 which exhibits a constant minimum cam height so that damper 15 C is closed throughout this process. Continuing joint movement of the control devices 1, 2 from indicating position B to indicating position C will cause roller device 16 A to move over a cam surface 13 with a constant minimum cam height so that damper 15 A in this region is fully closed. During that movement of the control devices 1,2, roller device 16 B will move from its maximum cam height value 13 B along a cam surface 13 with a progressively decreasing cam height until indicating position C, at which damper 15 B is fully closed, is reached. During said movement of the control devices 1,2, roller device 16 C will move along a cam surface with a progressively increasing cam height until maximum cam height is reached at position 13 C at which damper 15 C is fully open.

The intake air control described above achieved by simultaneous movement of the two control devices 1, 2 along a path 3 has the same effect as moving a single controlling device according to the prior. The fact that the present invention incorporates two control devices 1, 2 and respective cam devices 11 coupled to them means that said control of the intake air flow to said three intake air regions takes place in such a way that the intake air can be distributed to all three regions simultaneously and with the desired distribution. The fact that each roller device 16 A–C is flexibly arranged in the cam height direction and extends rigidly between the two cam devices 1, 2 means that the respective roller device 16 A–C will be acted upon by cam surfaces 13 of whichever of the two cam devices 11 exhibits the greater cam height in the region of the respective roller device A–C.

If for example the first control device 1 is placed in indicating position A while the second control device 2 is placed in indicating position C, roller device 16 A will thus be at its maximum cam height on surface 13 A of the first cam device 11, while roller device 16 C will be at its maximum cam height on surface 13 C of the second cam device 11. The two dampers 16 A, 16 C will therefore be open to the maximum extent. The fact that the two cam devices at indicating positions A and C exhibit their minimum cam height means that roller device 16 B will lead to damper 15 B being fully closed. The air supplied via the duct 18 to the damper housing 19 will therefore be distributed equally to the intake air regions with indicating positions A and C, i.e. the defroster region and the floor region. Intake air supply to all three intake air regions simultaneously is achieved by the first control device 1 being placed in the region between indicating positions A and B while the second control device 2 is placed in the region between indicating positions B and C. This will cause the air to be distributed to the various intake air regions simultaneously, with the distribution to the respective intake air regions being determined by the spacing between the control devices 1, 2 and the respective indicating positions A, B, C. The air is distributed equally to all three intake air regions if the first control device 1 is placed exactly between indicating positions A and B while the second control device 2 is placed exactly between indicating positions B and C.

The invention is in no way limited to the embodiment described above but may be varied within the scope of the patent claims.

What is claimed is:

1. A control unit for a ventilation arrangement in a motor vehicle wherein there are at least three intake air regions into the vehicle to which air flow is to be supplied through operation of the control unit, the control unit comprising:

a first control device including first elements positioned and operable for selectively opening and closing air flow to at most two of the at least three intake air regions at one time; the first control device further including a first visible indicator of the position of the first control device which indicates the extent, which is set by the first control device, to which the at most two intake air regions to the vehicle may deliver air to the vehicle; and a second control device including second elements positioned and operable for selectively opening and closing air flow to at most two of the at least three intake air regions at one time; the second control device further including a second visible indicator of the position of the second control device which indicates the extent, which is set by the second control device, to which the at most two intake air regions to the vehicle may deliver air to the vehicle.

2. The control unit of claim 1, wherein the first and second control devices are selectively operable so that the at least two air intake regions opened and closed by the first and second control devices are either the same intake regions or are different ones of the intake regions.

3. The control unit of claim 1, wherein both of the first and second control devices are movable along respective paths and the respective paths are a common path including the indicated positions associated with the respective air intake regions.

4. The control unit of claim 3, wherein individual positions are indicated along the common path, each position being respectively associated with one of the intake air regions of the vehicle, and each of the first and second control devices being movable along the common path to extend to the at most two of the individual positions associated with the at most two intake air controlled by the respective control device.

5. The control unit of claim 4, wherein the individual positions along the path are positioned to substantially symbolize the locations in the vehicle of the respective intake air regions in the vehicle corresponding to the individual positions.

6. The control unit of claim 4, wherein the first and second control devices are arranged one after another along the common path.

7. The control unit of claim 6, wherein the common path has a substantially arcuate section shape.

8. The control unit of claim 7, wherein the first and second control devices respectively comprise first and second pivoting levers, a common pivot for both of the first and second levers and the first and second levers are movable around their pivot on the arcuate section shape path.

9. The control unit of claim 8, wherein the arcuate section extends substantially in a vertical direction.

10. The control unit of claim 4, wherein the first and second control devices respectively include a first and second manually grippable part by which the control devices may be moved.

11. The control unit of claim 10, wherein the grippable part is a relatively long and narrow section which extends substantially perpendicular to the path of the control devices.

12. The control unit of claim 11, wherein the long and narrow section of each grippable part is oriented to point toward at least one of the individual positions then corresponding to the associated ones of the air intake regions controlled by the respective control device and to indicate the extent of opening of the air intake regions controlled by the respective control device.

13. The control unit of claim 1, further comprising controls connected with the air intake regions for selectively opening and closing the air intake regions, the controls for the air intake regions being connected with the respective control devices such that operation of the control devices along the paths correspondingly control the air flow through the respective air intake regions.

* * * * *